(12) United States Patent
Smetana

(10) Patent No.: US 9,574,071 B2
(45) Date of Patent: Feb. 21, 2017

(54) DISPERSIONS AND RELATED COATINGS AND CURED ARTICLES

(71) Applicant: SUNCOLOR CORPORATION, North Canton, OH (US)

(72) Inventor: David A. Smetana, North Canton, OH (US)

(73) Assignee: SUNCOLOR CORPORATION, North Canton, OH (US)

( * ) Notice: Subject to any disclaimer, the term of this patent is extended or adjusted under 35 U.S.C. 154(b) by 0 days.

(21) Appl. No.: 15/043,749

(22) Filed: Feb. 15, 2016

(65) Prior Publication Data

US 2016/0289426 A1 Oct. 6, 2016

Related U.S. Application Data

(63) Continuation of application No. 14/235,962, filed as application No. PCT/US2012/048894 on Jul. 30, 2012, now abandoned.

(60) Provisional application No. 61/513,261, filed on Jul. 29, 2011.

(51) Int. Cl.

| *C08K 5/549* | (2006.01) |
| *C08K 9/06* | (2006.01) |
| *C08K 9/02* | (2006.01) |
| *C09D 163/00* | (2006.01) |
| C08K 3/22 | (2006.01) |
| C09D 183/04 | (2006.01) |
| C09D 133/08 | (2006.01) |
| C09D 133/10 | (2006.01) |
| C08K 3/36 | (2006.01) |
| C09D 133/12 | (2006.01) |
| C08L 83/04 | (2006.01) |
| C09D 125/04 | (2006.01) |

(52) U.S. Cl.
CPC ............... *C08K 5/549* (2013.01); *C08K 9/02* (2013.01); *C08K 9/06* (2013.01); *C09D 163/00* (2013.01); *C08K 3/36* (2013.01); *C08K 2003/2241* (2013.01); *C08L 83/04* (2013.01); *C09D 125/04* (2013.01); *C09D 133/08* (2013.01); *C09D 133/10* (2013.01); *C09D 133/12* (2013.01); *C09D 183/04* (2013.01)

(58) Field of Classification Search
CPC ... C08K 5/549; C08K 2003/2241; C08K 3/36; C09D 163/00; C09D 183/04; C09D 133/08; C09D 133/10; C09D 133/12; C09D 125/04
See application file for complete search history.

(56) References Cited

U.S. PATENT DOCUMENTS

| 2004/0163570 A1* | 8/2004 | Vanmaele | ............ C09D 11/101 106/31.13 |
| 2005/0142354 A1* | 6/2005 | Chen | ................... C09D 183/04 428/328 |
| 2009/0017316 A1* | 1/2009 | Kato | ....................... C08L 79/04 428/447 |
| 2012/0282447 A1* | 11/2012 | Gringoire | ................ C08J 7/045 428/216 |

\* cited by examiner

*Primary Examiner* — Margaret Moore
(74) *Attorney, Agent, or Firm* — Renner, Kenner; Arthur M. Reginelli

(57) ABSTRACT

A pre-dispersion composition comprising (i) a silsesquioxane; (ii) a dispersing agent; and (iii) a curable resin.

18 Claims, No Drawings

DISPERSIONS AND RELATED COATINGS AND CURED ARTICLES

This application in a CON of U.S. Ser. No. 14/235,962, filed Apr. 21, 2014, now abandoned.

FIELD OF THE INVENTION

Embodiments of the present invention relate to dispersions including polymerizable monomer, a silsesquioxane, a dispersing agent, and particulate, as well as coatings and cured articles made from the same.

BACKGROUND OF THE INVENTION

In the paints, coatings, inks, and adhesives ("coatings") industries, it is desirable to produce low viscosity dispersions of resins that include pigments and/or particulate fillers that exhibit excellent dispersion of the pigment and filler particles in which (i) the pigments and fillers, particularly sub-micron sized or nano-sized, pigments or fillers are de-agglomerated and reduced to their primary particle size; (ii) the subject particles are physically separated from each other or uniformly spaced in the polymer; (iii) the resultant dispersions comprising polymeric resins, pigments, and fillers, and/or combinations of pigments and fillers are stable; and (iv) the pigments and fillers do not settles or re-agglomerate. Nano-sized pigments and nano-particles can be dispersed and reduced to their primary particle size in a low viscosity format. It is further desirable that the low viscosity dispersions as described above maximize the weight percent loading of the pigments and/or fillers while minimizing the weight percent loadings of the polymer, liquid solids so that a final polymeric paint, coating, or ink composition can be produced in and of itself having very low viscosity, high tinting strength caused by optimized pigment concentrations and/or maximized mechanical properties caused by homogenous dispersion of maximized concentrations of fillers. The polymeric resin solids used as the mill base for the dispersions can be 100% liquid solids or a combination of liquid solids and solvents. There is a further, particular need in the referenced industries to have very low viscosity dispersions as described above that either have very low solvent contents or, preferably, no solvent content that can be used for producing, for example, low viscosity, 100% solvent free, radiation curable coatings. A complete description of the nature and benefits radiation curable coatings can be found in the publication entitled "*Radiation Curing of Coating.*" Joseph V. Koleske, ASTM International, 100 Barr Harbor Drive, West Conoshohocken, Pa., 2002.

Every day, throughout the world, manufacturing companies of all sizes use paints, coatings, and inks to protect and decorate a wide variety of composite or laminate products ranging from heavy equipment parts, automobile parts, appliance casings, metal cans, and other metal sheets that are pre-painted and then shaped into finished metal containers and panels. Traditionally, solvents have been used in high concentrations to produce low viscosity paints and coatings that have high pigment and filler loadings and that can be easily and smoothly applied to plastic, wood, and metal substrates with such coatings having optimized aesthetics, opaque pigment color, and optimized mechanical and chemical resistance properties. Whereas traditional solvent-base coatings have solvent contents from 40% to 90% by total coating weight, there is a growing demand and need by industry to dramatically reduce or eliminate the use of solvents in coatings due to environmental and safety concerns. High solids coatings and radiation curable coatings are considered to be ecologically friendly and contain little or no solvents. These coatings are also far more energy efficient due to reduced energy costs for curing and other economic efficiencies, such as accelerated curing times. There is a need for low viscosity, high filled pigment and/or filler dispersions in polymeric resins that are highly stable and homogenous that can be used to produce commercially viable, low viscosity paints, coatings, and ink compositions that are (i) low in solvent concentration or solvent free, (ii) have excellent application characteristics such as flow and leveling equal to their solvent-based counterparts; (ii) and are equally as functional in aesthetic and physical quality as high solvent coatings.

Dispersions are often quite expensive and it is highly desirable to have a low viscosity dispersion having a high concentration of pigments and/or particulate fillers so that optimized amounts of dispersion are used in the final coating compositions. Low viscosity, highly filled dispersions can be used to make very thin coating films, having excellent opaque colors. Very thin films, applied to substrates, use coatings more efficiently, lowering coating costs, lowering curing energy costs, while increasing productivity. On the other hand, low viscosity, highly filled dispersions can be used to make thick coating compositions for casting such as casting prototypes. In any case, low viscosity, highly filled dispersions are advantageous when optimizing finished coating viscosities, color fastness, and mechanical properties.

The publication, Hyperdispersants, Technology & Benefits, The Lubrizol Corporation, HD-002, July, 2008, teaches that polymeric hyperdispersants produce improved pigment dispersions by attaching polymer chains to an anchoring group such as a pigment which separates or de-agglomerates the pigment particles and sterically stabilizes the dispersion of particles. The publication further teaches that the hyperdispersant or polymeric chain competes with the dispersion resin and other additives for attachment to pigment or particle surfaces. Therefore, it is taught to use only a hyperdispersant such as Solsperse® to attach to either a surface treated or an un-surface treated pigment or particle in a dispersion of liquid resin and pigments particles. Any other additives should be added after the pigment dispersion is let down and mixed into the final coating formulas so that other dispersing and surfactant additives do not detach the hyperdispersant (anchoring polymer chain) from the pigment particle surface. The publication goes on to teach that pigment particle surfaces should, preferably, not be treated since the hyperdispersant will not attach to a treated surface. It also teaches that it is preferred to use a high viscosity resin because a low viscosity resin wets the pigment surface and also competes with the hyperdispersant for attachment to the pigment surface, and, as such, better results can be attained by using a higher viscosity resin. When applied as directed, the pigment dispersion containing a hyperdispersant, liquid resin, a pigment, and solvents will have a lower viscosity than a similar pigment dispersion without a hyperdispersant. The publication fails to teach the use of a hyperdispersant in combination with other polymeric dispersants or chemicals, and, in fact, teaches not to use a hyperdispersant with any other dispersant or chemical when making pigment particle dispersions because the pigments will re-agglomerate and the pigment dispersion will be unstable. Dispersions made from hyperdispersants alone are limiting in producing a low viscosity dispersion with high concentrations of pigments and/or particles.

U.S. Pat. No. 6,660,374 B2 discloses radiation curable compositions that comprise solid, amorphous glass particles that are transparent to radiation, such as UV light, that improve the radiation curing behavior of such coatings. The patent teaches that such glass particles can be de-agglomerated and more fully dispersed by silane surface treating the glass particles prior to dispersing the glass particles into the coating. However, the patent does not disclose or teach the use of dispersants added to a resin to make a pre-dispersion of either pigments and/or glass particles.

POSS® Titania, Hybrid Plastics, February, 2007 discloses the use of POSS (Polyhedral Oligomeric Silsesquioxane) silanols to coat the surfaces of silicas and metal oxides, such as $TiO_2$, in order to enhance dispersion and make a dispersion more stable. The publication also teaches that the POSS silanols are used alone to treat pigment surfaces such as $TiO_2$. The publication does not teach or disclose the use of POSS silanols with hyperdispersants. Dispersions made from POSS alone are limiting in producing a low viscosity dispersion with high concentrations of pigments and/or particles.

SUMMARY OF THE INVENTION

One or more embodiments of the present invention provide a pre-dispersion composition comprising (i) a silsesquioxane; (ii) a dispersing agent; and (iii) a curable resin.

Still other embodiments of the present invention provide a dispersion composition comprising (i) a silsesquioxane; (ii) a dispersing agent; (iii) a particulate; and (iv) a curable resin.

Still other embodiments of the present invention provide a coating composition formed by combining curable monomer and a dispersion, where the dispersion includes (a) a silsesquioxane; (b) a dispersing agent; and (c) a curable resin.

Still other embodiments of the present invention provide a method for preparing a coating composition, the method comprising adding a dispersion to a coating composition, where the dispersion includes (a) a silsesquioxane; (b) a dispersing agent; and (c) a curable resin.

Still other embodiments of the present invention provide a composition that is the combination of a silsesquioxane and a dispersing agent.

DETAILED DESCRIPTION OF ILLUSTRATIVE EMBODIMENTS

Embodiments of the invention are based, at least in part, on the discovery of a pre-dispersion that includes a silsesquioxane, a dispersing agent, and polymerizable monomer. These pre-dispersions can be combined with particulate to form dispersions that are advantageously stable and have relatively low viscosity at high loading of particulate, even when little or no solvent is included in the dispersion. It is believed that a synergy exists between the dispersing agent and the silsesquioxane. Thus, while the prior are teaches the use of either silsesquioxanes or dispersing agent, it has been observed that the use of both silsesquioxanes and dispersants leads to unexpected results. Advantageously, the dispersions of one or more embodiments of the invention can be added to coating compositions that may be characterized by controllable viscosities, desirable color, high particulate content, flow and leveling, as well as advantageous mechanical properties.

Silsesquioxanes

In one or more embodiments, silsesquioxanes, which may also be referred to as polysilsesquioxanes or oligomeric silsesquioxanes, are materials represented by the formula $[RSiO_{1.5}]_\infty$ where ∞ represents molar degree of polymerization and R is a monovalent organic group. In one or more embodiments, the monovalent organic group may include a hydrocarbyl group, a hydrocarbyloxy group, and a siloxy group. The nature and scope of silsesquioxanes are well known in the art as evidenced by U.S. Pat. Nos. 7,723,415, 6,911,518, 6,927,270, 6,933,345, 6,972,312, 7,485,692, 7,638,195, 7,723,415, 7,737,228, 7,888,435, and 7,897,667, which are incorporated herein by reference.

In one or more embodiments, the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbyl groups in which one or more hydrogen atoms have been replaced by a substituent such as an alkyl group. In one or more embodiments, the hydrocarbyl groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In one or more embodiments, the hydrocarbyloxy groups include, but are not limited to, alkoxy, cycloalkoxy, substituted cycloalkoxy, alkenyloxy, cycloalkenyloxy, substituted cycloalkenyloxy, aryloxy, allyloxy, substituted aryloxy, aralkyloxy, alkaryloxy, or alkynyloxy groups. Substituted hydrocarbyloxy groups include hydrocarbyloxy groups in which one or more hydrogen atoms attached to a carbon atom have been replaced by a substituent such as an alkyl group. In one or more embodiments, the hydrocarbyloxy groups may include from one, or the appropriate minimum number of carbon atoms to form the group, to 20 carbon atoms. The hydrocarbyloxy groups may contain heteroatoms such as, but not limited to nitrogen, boron, oxygen, silicon, sulfur, and phosphorus atoms.

The monovalent organic groups (e.g. the hydrocarbyl and hydrocarbyloxy groups) may include heteroatoms such as, but not limited to, oxygen, nitrogen, silicon, sulfur, phosphorus, chlorine, bromine, and fluorine. The heteroatoms may form functionalities such as hydroxyl groups and/or carbonyl groups, which may form ester groups, alcohol groups, acid groups, and ketone groups and acyl groups. Other functionalities include, but are not limited to, amines, ethers, and epoxides.

Silsesquioxanes may be either homoleptic or heteroleptic. Homoleptic systems contain only one type of R group while heteroleptic systems contain more than one type of R group. As a special case R may also include fluorinated organic groups. In one or more embodiments, the silsesquioxanes may be defined by the formula $[(RSiO_{1.5})_n]_{\Sigma\#}$ for homoleptic compositions, $[(RSiO_{1.5})_n(R'SiO_{1.5})_m]_{\Sigma\#}$ for heteroleptic compositions (where R≠R'), $[(RSiO_{1.5})_n(RXSiO_{1.0})_m]_{\Sigma\#}$ for functionalized heteroleptic compositions (where R groups can be equivalent or inequivalent), and $[(RSiO_{1.5})_n(RSiO_{1.0})_m (M)_j]_{\Sigma\#}$ for heterofunctionalized heteroleptic compositions. In all of the above R is the same as defined above and X includes but is not limited to OH, Cl, Br, I, alkoxide (OR), acetate (OOCR), peroxide (OOR), amine ($NR_2$), isocyanate (NCO), and R. The symbol M refers to metallic elements within the composition that include high and low Z metals including s and p block metals, d and f block transition, lanthanide, actinide metals, in particular, Al, B, Ga, Gd, Ce, W, Ni, Eu, U, Y, Zn, Mn, Os, Ir, Ta, Cd, Cu, Ag, V, As, Tb, In, Ba, Ti, Sm, Sr, Pt, Pb, Lu, Cs, Tl, and Te. The symbols m, n and j refer to the stoichiometry of the composition. The symbol □ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that Σ# is not to be confused as a multiplier for determining stoichiometry, as it merely describes the overall nanostructural characteristics of the system (aka cage size).

In one or more embodiments, silsesquioxanes include polyhedral silsesquioxanes, ladder-structured silsesquioxanes, and fully random silsesquioxanes. The polyhedral silsesquioxanes include caged and partial caged structures, the latter of which lacks a complete connection of all units in the cage.

In one or more embodiments, the silsesquioxanes employed in practice of the present invention include one or more hydrophobic substituents and one or more hydrophilic substituents.

In one or more embodiments, the silsesquioxanes are partial caged structures that may be defined by the formula

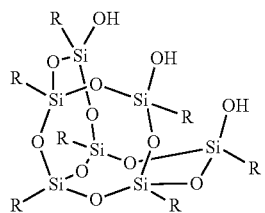

where each R is independently a monovalent organic group. These partial caged structures of these embodiments may be referred to as silanols. In particular embodiments, each R is a phenyl group. In other embodiments, each R is a branched alkyl group such as an iso-octyl group.

In one or more embodiments, useful silsesquioxanes include 1,3,5,7,9,11,14-heptahydrocarbyltricyclo[7.3.3.1(5,110]heptasiloxane-endo-3,7,14-triols such as, but not limited to, 1,3,5,7,9,11,14-heptaphenyltricyclo[7.3.3.1(5,110] heptasiloxane-endo-3,7,14-triol, 1,3,5,7,9,11,14-heptaisobutyltricyclo[7.3.3.1(5,110]heptasiloxane-endo-3, 7,14-triol, 1,3,5,7,9,11,14-heptaisooctyltricyclo[7.3.3.1(5, 110]heptasiloxane-endo-3,7,14-triol, 1,3,5,7,9,11,14-heptaethyltricyclo[7.3.3.1(5,110]heptasiloxane-endo-3,7, 14-triol, 1,3,5,7,9,11,14-heptacyclopentyltricyclo[7.3.3.1(5, 110]heptasiloxane-endo-3,7,14-triol, and 1,3,5,7,9,11,14-heptacyclohexyltricyclo[7.3.3.1(5,110]heptasiloxane-endo-3,7,14-triol.

Useful polyhedral silsesquioxanes include those available under the tradenames Polyhedral Oligomeric Silsesquioxane (POSS), Polyhedral Oligometallosesquioxane (POMS), and Polyhedral Oligomeric Silicate (POS) (Hybrid Plastics). Other commercial sources include those available under the tradenames Janus Cubes, Phenyls, and T-Cages (Mayaterials). Specific examples of useful silsesquioxanes include those available under the tradenames SO1400(trisilanolcyclohexyl POSS), SO1430 (trisilanolcyclopentyl POSS), SO1440 (disilanolisobutyl POSS), SO1444 (trisilanolethyl POSS), SO1450 (trisilanolisobutyl POSS), SO1455 (trisilanolisooctyl POSS), SO1457 (trisilanolphenyl POSS lithium salt), SO1458 (trisilanolphenyl POSS), and SO1460 (tetrasilanolphenyl POSS).

Dispersing Agent

In one or more embodiments, dispersing agents include those known compounds for dispersing particulate (e.g. inorganic and organic pigments and inorganic and organic particulates) in resin when preparing the dispersions or coatings. One or more dispersing agents may be employed.

In one or more embodiments, useful dispersing agents include organic molecules having a first portion that has high affinity for inorganic particles or with a so-called synergist (i.e. a further substance chemisorbed on the particles to provide an anchor point for the dispersing agent), a second portion that has affinity for (or solubility in or miscibility with) the non-aqueous liquid medium, and a third portion whereby the first two portions are linked together. Alternatively, the dispersing agents may be organic molecules having said first and second portions with no third (linking) portion; i.e. the first and second portions may be directly linked together with no intermediate moiety.

In one or more embodiments, the dispersing agent is a hyperdispersant, which refers to networked or polymerized surfactants. The hyperdispersants may be distinguished from hydrophobising surface treatment agents by their matrix of interlinked hydrocarbon chains, as compared to the single chains of conventional surface treatment agent molecules. Hyperdispersants are known in the art as evidenced by U.S. Publ. Nos. 2008/0287554, 2007/0289501, and 2006/144292, and 2008/0269381, which are incorporated herein by reference.

An example of a hyperdispersant is a polymerized (or interesterified) hydroxycarboxylic acid. These hydroxycarboxylic acids may include long organic carbon chains such as those include at least about 12, for example between about 15 and about 25, carbon atoms in the chain. Suitable hyperdispersants include poly-hydroxy-(long chain fatty acids) (where "long chain fatty acids" refers particularly to alkyl and alkenyl carboxylic acids having at least about 12, for example from about 12 to about 25, for example about 15 to about 18, carbon atoms in the alkyl or alkenyl chain), such as polyhydroxystearic acids and salts thereof such as sodium or potassium salts. These poly-hydroxy-(long chain fatty acids) are suitably prepared, for example, by polycondensation of a hydroxy-(long chain fatty acid), such as a hydroxystearic acid such as 12-hydroxystearic acid.

In one or more embodiments, useful hyperdispersants may be characterized by a number average molecular weight of from about 500 to about 30,000 g/mole and in other embodiments from about 1500 to about 10,000 g/mole. In these or other embodiments, the hyperdispersants may be characterized by a weight average molecular weight of less than 100,000, in other embodiments less that 50,000, and in other embodiments less than 30,000 g/mole.

Suitable hyperdispersants are commercially available under the tradename Solsperse™ (Lubrizol), such as Solsperse 3000, and Hypermer™ (Uniquema), such as Hypermer LP-1. Other examples includes Solsperse™39000 (LUBRIZOL), which is believed to be a polyethyleneimine core grafted with polyester-hyperdispersant.

Particulate

In one or more embodiments, the particulate includes pigment and/or particulate filler. The pigments and particulate fillers may be treated or untreated. For example, they may be treated with at least one hydrophobising surface treatment agent.

In one or more embodiments, the particulate may have a mean particle diameter size of about 0.01 microns to about 1000 micron or more, or in other embodiments from about 0.05 microns to about 100 microns, or in other embodiments from about 0.07 to about 10 microns.

In one or more embodiments, examples of useful particulate include any organic or inorganic pigment, or combination thereof. Examples include, but are not limited to, titanium dioxide (TiO2), TiO2 opacifiers and extenders, such as calcium carbonate, clay, opaque polymers and pre-composite polymers, such as Ropaque™ and Evoque™ (Dow Corning Materials), yellow, blue, carbon black, metallic, conductive, luminescent, fluorescent, phosphorus, and quantum dots pigments. An extensive list of suitable pigments and guidelines for use can be found in the European Coatings Handbook, Thomas Brock, Michael Groteklaes, Peter Mischke, Vincentz Network GmbH & Co, 2000, which is incorporated by reference.

In one or more embodiments, examples of useful particulate include any organic and inorganic particulate fillers, or combinations thereof. Examples include, but are not limited to, nanoparticles, silica, fused, amorphous silica, metal oxides, minerals, extenders, such as aluminum oxide, hollow glass spheres, organic polymer solids, and quantum dots. A wide variety of diluents can also be used in the dispersions and coatings. A complete list of suitable particulates, fillers, extenders, and diluents can be found in the Handbook of Fillers, Extenders, and Diluents, Michael and Irene Ash, Synapse Information resources, 2007, which is incorporated herein by reference.

In one or more embodiments, the silsesquioxane may be employed within the dispersions as the particulate component.

Polymerizable Monomer

In one or more embodiments, the dispersion is made with at least one polymerizable monomer, which may also be referred to as curable resin or simply resin. As is known in the art, certain resin may include oligomeric molecules, but for purposes of this disclosure and claims, the term polymerizable monomer, curable resin, or resin will encompass oligomeric molecules that are likewise curable. Practice of one or more embodiments of the invention are not necessarily limited by the selection or use of any particular resin. Any applicable, non-aqueous resin is suitable, and a list of applicable resins and guidelines for use can be found in The European Coatings Handbook, by Thomas Brock, Michael Groteklaes, and Peter Mischke, Vincent Network GmbH & Co. KG, 2000.

Although not required, the resin may be selected from those resins that are employed in making a coating composition according to one or more aspects of the invention. In one or more embodiments, the resin employed in the dispersion is the same as at least one of the resins employed in making the coating composition. Resins useful for preparing coating compositions according to one or more aspects of the present invention are set forth below and are hereby incorporated into the discussion of dispersions. For the sake of brevity, they are not repeated here other than by summary. For example, the resins useful for making dispersions according to one or more aspects of the present invention include UV-curable resins such as acrylates, methacrylates, mono-vinyl aromatics, vinyl naphthalenes, and N-vinyl type resins. Other examples include cationically-polymerizable monomers such as epoxides, vinyl ethers, mono-vinyl aromatics, oxetanes, oxazolines, vinylnaphthalenes, N-vinyl heterocyclic compounds, and tetrahydrofurfuryl compounds.

Solvents

In certain embodiments, it can be advantageous to add a small amount of an organic solvent to improve the dissolution of the dispersant. In other cases, it can be advantageous to add a small amount of water, for example, to improve the spreading of the dispersions and/or coating compositions on a hydrophilic surface. In one or more embodiments, useful organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used. A complete list of suitable solvents can be found in the Handbook of Solvents, George Wypych, ed., ChemTec Publishing, 2001, which is incorporated herein by reference.

In one or more embodiments, the dispersions of the present invention may include other constituents or ingredients that may be used in the preparation of dispersions and/or coating compositions. In this regard, reference is made to the coating compositions presented herein below.

Pre-Dispersion and Dispersion Component Amounts

In one or more embodiments, the pre-dispersions may include at least 0.5 wt %, in other embodiments at least 1.0 wt %, in other embodiments at least 2.0 wt %, and in other embodiments at least 2.5 wt % silsesquioxane (e.g. a polyhedral silsesquioxane) based on the entire weight of the pre-dispersion. In these or other embodiments, the pre-dispersions may include at most 40 wt %, in other embodiments at most 30 wt %, in other embodiments at most 20 wt %, in other embodiments at most 10 wt %, in other embodiments at most 5 wt %, and in other embodiments at most 3 wt % silsesquioxane based on the entire weight of the pre-dispersion. In one or more embodiments, the pre-dispersions may include from about 0.5 to about 40 wt %, in other embodiments from about 2.0 to about 30 wt %, and in other embodiments from about 2.5 wt % to about 10 wt % silsesquioxane based on the entire weight of the pre-dispersion.

In one or more embodiments, the pre-dispersions may include at least 0.5 wt %, in other embodiments at least 1.0 wt %, in other embodiments at least 2.0 wt %, and in other embodiments at least 2.5 wt % dispersing agent (e.g. a polymerized hydroxycarboxylic acid) based on the entire weight of the pre-dispersion. In these or other embodiments, the pre-dispersions may include at most 30 wt %, in other embodiments at most 20 wt %, in other embodiments at most 10 wt %, in other embodiments at most 5 wt %, and in other embodiments at most 3 wt % dispersing agent based on the entire weight of the pre-dispersion. In one or more embodiments, the pre-dispersions may include from about 0.5 to about 30 wt %, in other embodiments from about 2.0 to about 20 wt %, and in other embodiments from about 2.5 wt % to about 10 wt % dispersing agent based on the entire weight of the pre-dispersion.

In one or more embodiments, the pre-dispersions may include at least 1 wt %, in other embodiments at least 20 wt %, in other embodiments at least 30 wt %, and in other embodiments at least 40 wt % resin based on the entire weight of the pre-dispersion. In these or other embodiments, the pre-dispersions may include at most 99 wt %, in other embodiments at most 80 wt %, in other embodiments at most 70 wt %, and in other embodiments at most 60 wt % resin based on the entire weight of the pre-dispersion. In one or more embodiments, the pre-dispersions may include from about 1 to about 99 wt %, in other embodiments from about 30 to about 70 wt %, and in other embodiments from about 40 wt % to about 60 wt % resin based on the entire weight of the pre-dispersion.

In one or more embodiments, the dispersions, which may also be referred to as polymeric dispersions or polymerizable dispersions, may include at least 0.1 wt %, in other embodiments at least 0.3 wt %, in other embodiments at least 0.5 wt %, and in other embodiments at least 1.0 wt % silsesquioxane (e.g. a polyhedral silsesquioxane) based on the entire weight of the dispersion. In these or other embodiments, the dispersions may include at most 40 wt!%, in other embodiments at most 30 wt %, in other embodiments at most 20 wt %, in other embodiments at most 10 wt %, in other embodiments at most 5 wt %, and in other embodiments at most 3 wt % silsesquioxane based on the entire weight of the dispersion. In one or more embodiments, the dispersions may include from about 0.1 to about 40 wt %, in other embodiments from about 0.8 to about 5 wt %, and in other embodiments from about 1.0 wt % to about 3 wt % silsesquioxane based on the entire weight of the dispersion.

In one or more embodiments, the dispersions may include at least 0.1 wt %, in other embodiments at least 0.3 wt %, in other embodiments at least 0.5 wt %, and in other embodiments at least 1.0 wt % dispersing agent (e.g. a polymerized hydroxycarboxylic acid) based on the entire weight of the dispersion. In these or other embodiments, the dispersions may include at most 30 wt %, in other embodiments at most 20 wt %, in other embodiments at most 10 wt %, in other embodiments at most 5 wt %, and in other embodiments at most 3 wt % dispersing agent based on the entire weight of the dispersion. In one or more embodiments, the dispersions may include from about 0.1 to about 30 wt %, in other embodiments from about 0.8 to about 5 wt %, and in other embodiments from about 1.0 wt % to about 3 wt % dispersing agent based on the entire weight of the dispersion.

In one or more embodiments, the weight ratio of silsesquioxane to dispersing agent (i.e. silsesquioxane:dispersing agent) may be at least 0.5:1, in other embodiments at least 1:1, in other embodiments at least 1.5:1, in other embodiments at least 2:1. In one or more embodiments, the weight ratio of silsesquioxane to dispersing agent may be from about 0.5 to about 3 parts silsesquioxane per part of dispersing agent, in other embodiments from about 1 to about 2.5 parts silsesquioxane per part of dispersing agent, and in other embodiments, from about 1.5 to about 2.0 parts silsesquioxane per part of dispersing agent.

In one or more embodiments, the dispersions may include at least 1 wt %, in other embodiments at least 10 wt %, in other embodiments at least 20 wt %, in other embodiments at least 30 wt %, in other embodiments at least 40 wt %, in other embodiments at least 45 wt %, in other embodiments at least 50 wt %, and in other embodiments at least 55 wt % particulate (e.g. titanium dioxide) based on the entire weight of the dispersion. In these or other embodiments, the dispersions may include at most 99 wt %, in other embodiments at most 90 wt %, in other embodiments at most 88 wt %, and in other embodiments at most 85 wt % particulate based on the entire weight of the dispersion. In one or more embodiments, the dispersions may include from about 1 to about 99 wt %, in other embodiments from about 10 to about 88 wt %, and in other embodiments from about 50 wt % to about 85 wt % particulate based on the entire weight of the dispersion.

In one or more embodiments, the dispersions may include at least 1 wt %, in other embodiments at least 20 wt %, in other embodiments at least 30 wt %, and in other embodiments at least 40 wt % resin based on the entire weight of the dispersion. In these or other embodiments, the dispersions may include at most 90 wt %, in other embodiments at most 80 wt %, in other embodiments at most 70 wt %, and in other embodiments at most 60 wt % resin based on the entire weight of the dispersion. In one or more embodiments, the dispersions may include from about 1 to about 90 wt %, in other embodiments from about 30 to about 70 wt %, and in other embodiments from about 40 wt % to about 60 wt % resin based on the entire weight of the dispersion.

In those embodiments where a solvent is employed, the dispersions may include less than 20 wt %, in other embodiments less than 10 wt %, in other embodiments less than 5 wt %, and in other embodiments less than 1 wt % solvent, based upon the entire weight of the dispersion. In certain embodiments, the dispersions are substantially devoid of solvent, which refers to that amount or less than would otherwise have an appreciable impact on the dispersion. In certain embodiments, the dispersions are devoid of solvent. In one or more embodiments, the dispersions include less than 3 wt %, in other embodiments less than 1 wt %, and in other embodiments less than 0.1 wt % water. In certain embodiments, the dispersions are substantially devoid of water, which refers to that amount or less than would otherwise have an appreciable impact on the dispersion. In certain embodiments, the dispersions are devoid of water.

Preparation of Dispersions

In one or more embodiments, the dispersions of the present invention may be prepared by first mixing the resin, the silsesquioxane, and the dispersing agent to form a pre-dispersion. Mixing of these constituents can take place over a wide range of temperatures including, for example, about 33° F. to about 400° F., or in other embodiments from about 40° F. to about 200° F. Mixing of the constituents can be accomplished by using any known stirring techniques including, but not limited to, a hand stirring blade. In one or more embodiments, mixing is continued until a homogeneous composition is obtained.

In those embodiments where a pre-dispersion is first prepared, the pre-dispersion can then be combined and mixed with the particulate to form the dispersion composition. Mixing of the pre-dispersion with the particulate can take place over a wide range of temperatures including, for example, about 33° F. to about 400° F., or in other embodiments from about 40° F. to about 200° F. Mixing of the pre-dispersion with the particulate can be accomplished by using any known mixing techniques known in the art for mixing solids include, but not limited to, a high speed dispersing blades, such as a CONN Blade at 62° F. In lieu of or in addition to the use of high speed dispersing blades, the pre-dispersion and the particulate may be mixed or processed within a pigment grinding mill, such as a Hockmeyer Immersion Mill. Using a pigment grinding mill may allow a coating formulator to reduce the filler particulate to its primary size. Using a pigment grinding mill may allow a coating formulator to reduce the filler particulate to its primary size, or a preferred size of less than a 0 Hegman grind, or in other embodiments a Hegman grind of less than 4, or in other embodiments, a Hegman grind of less than 7. Hegman grind indicates the finesses of the pigment size. A complete description of Hegman grind instruments and related test process can be obtained by contacting BYK-Gardner USA, Columbia, Md. Using a pigment grinding mill may allow a coating formulator to reduce the particulate filler to its primary size.

Characteristics of Dispersions

In one or more embodiments, the dispersions are advantageously stable, which refers to the fact that the pigment and/or filler particulates do not settle appreciably and that minor settling can be overcome with agitation. And, stability can also be observed where the pigments and/or particulate fillers do not reagglomerate. For example, in one or more embodiments, the dispersion of the dispersions can be placed in an oven at 55° C. for seven days and maintain their original viscosity within at most 20%, in other embodiments at most 15%, in other embodiments at most 10%, and in other embodiments at most 5% of their original viscosity. The relative viscosities can be lowered proportionately by elevating the temperature of the polymeric dispersion and/or by adding applicable amounts of solvents.

INDUSTRIAL APPLICABILITY

In one or more embodiments, the dispersions of the present invention may be used to prepare coating compositions that may ultimately be used to form cured coatings. In other words, the dispersions may be let down into other coating compositions, which may, as generally known in the art, include curable resin, cure initiators, and other known additives. Coating compositions formed in this manner are generally known as evidence by U.S. Pat. No. 6,660,374, which is incorporated herein by reference. The coating compositions can be applied to a wide variety of substrates including metal, plastic, wood, glass, and other composites, such as fiberglass, to form a cured coating or laminate.

Monomer

Any polymerizable compound commonly known in the art may be employed as a curable resin within the coating. As suggested above, UV curable resins may be used such as acrylates, methacrylates, mono-vinyl aromatics, vinyl naphthalenes, and N-vinyl compounds. In other embodiments, cationic curable compounds may be employed.

Examples of acrylates include monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy (meth)acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerithritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate, and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate, and neopentyl glycol diacrylate.

Other suitable trifunctional acrylates include propoxylated glycerine triacrylate and propoxylated trimethylolpropane triacrylate.

Other suitable higher functional acrylates include ditrimethylolpropane tetraacrylate, dipentaerythritol pentaacrylate, ethoxylated pentaerythritol tetraacrylate, methoxylated glycol acrylates and acrylate esters.

Furthermore, methacrylates, which may correspond to the above-mentioned acrylates, may be used with these acrylates. For example, suitable methacrylates include methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate. Certain methacyrlates may be preferred due to their relatively high sensitivity and higher adhesion to an ink-receiver surface.

Furthermore, the dispersions and coatings may also contain polymerizable oligomers. Examples of these polymerizable oligomers include epoxy acrylates, aliphatic urethane acrylates, aromatic urethane acrylates, polyester acrylates, and straight-chained acrylic oligomers.

Examples of monovinyl aromatic compounds include styrene, p-methylstyrene, p-methoxystyrene, β-methylstyrene, p-methyl-β-methylstyrene, α-methylstyrene, and p-methoxy-β-methylstyrene.

Examples of vinylnaphthalene compounds include 1-vinylnaphthalene, □-methyl-1-vinylnaphthalene, β-methyl-1-vinylnaphthalene, 4-methyl-1-vinylnaphthalene, and 4-methoxy-1-vinylnaphthalene.

Examples of N-vinyl compounds include N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam, and N-vinylimidazole.

Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N-, O-, S- or P-heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof. Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968), which are incorporated herein by reference.

Examples of cationic curable compounds having at least one epoxy group include 1,4-butanediol diglycidyl ether, 3-(bis(glycidyloxymethyl)methoxy)-1,2-propane diol, limonene oxide, 2-biphenyl glycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F, and A-based epoxides and epoxidized novolaks.

Suitable epoxy compounds including at least two epoxy groups in the molecule include alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic bisepoxides include copolymers of epoxides and hydroxyl components such as glycols, polyols, or vinyl ether, such as 3,4-epoxycyclohexylmethyl-3',4'-epoxycyclohexylcarboxylate; bis(3,4-epoxycyclohexylmethyl) adipate; limonene bisepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, α-methylisobutyl vinyl ether and β-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis[4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene) biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis([1-ethyl(3-oxetanil)]methyl)ether, 3-ethyl-3-[(2-ethylhexyloxy)methyl]oxetane, 3-ethyl-[(tri-ethoxysilyl propoxy)methyl]oxetane, and 3,3-dimethyl-2 (p-methoxyphenyl)-oxetane.

In one or more embodiments, vinyl ether acrylates may be used. These curable resins may be used in both radiation and cationically curable compositions. Curable compositions of this nature are known in the art as evidenced by U.S. Pat. No. 6,310,115, which is incorporated herein by reference. Examples of these resins include 2-(2-vinyloxyethoxy)ethyl (meth)acrylate and 2-(2-vinyloxyethoxy)ethyl acrylate. Reference is also made to U.S. Publ. No. 2010/0039463, which is incorporated herein by reference.

Cure Initiators

In one or more embodiments, the coating compositions prepared according the present invention may include a cure initiator. As noted above, the dispersion may also include a cure initiator. In one or more embodiments, a thermal initiator may be employed. In other embodiments, a photo-initiator may be employed. As is known in the art, photo-initiators typically require less energy to activate than the monomers, oligomers and/or prepolymers. Suitable photo-initiators include Norrish type I initiators, Norrish type II initiators, or a photo-acid generator.

Examples of thermal initiators include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

Examples of Norrish type I-initiators include benzoinethers, benzyl ketals, α,α-dialkoxyacetophenones, α-hydroxyalkylphenones, α-aminoalkylphenones, acylphosphine oxides, acylphosphine sulfides, α-haloketones, α-halosulfones and α-halophenylglyoxalates.

Examples of Norrish type II-initiators include benzophenones, thioxanthones, 1,2-diketones and anthraquinones. These initiators may be used with a co-initiator such as an aliphatic amine, an aromatic amine and a thiol. Specific examples include tertiary amines, heterocyclic thiols, and 4-dialkylamino-benzoic acid.

In one or more embodiments, useful photo-initiators or photo-initiator systems absorb light and thereby produce an initiating species, such as free radicals and cations, which are high-energy species that induce polymerization of monomers, oligomers and polymers and with polyfunctional monomers and oligomers thereby also inducing cross-linking.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294, which is incorporated herein by reference.

Specific examples of photo-initiators may include, but are not limited to, benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride, and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, Lucerin TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

In one or more embodiments, suitable cationic photo-initiators include compounds that form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

In one or more embodiments, it is useful to use 2 types of photo-initiators together, especially where irradiation with actinic radiation may be realized in two steps by changing wavelength or intensity. In other embodiments, a combination of different types of initiators, for example, a photo-initiator and a thermal initiator, can also be used.

The dispersion and the coatings may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable coating composition.

In order to increase the photosensitivity further, the dispersion and the coating may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the coating composition.

Suitable examples of co-initiators can be categorized in 4 groups: (1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; (3) (meth)acrylated amines such as dialkylamino alkyl(meth)acrylates (e.g., diethyl aminoethylacrylate) or N-morpholinoalkyl-(meth)acrylates (e.g., N-morpholinoethyl-acrylate); and (4) amides or ureas.

In certain embodiments, the initiator system includes 2,2'-bis(o-chlorophenyl)-4,4',5,5'-tetraphenyl-(7CI,8CI) 4,4'-Bi-4H-imidazole, which may be defined by the formula:

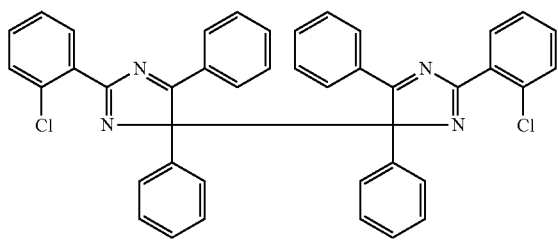 [SMILES: Clc1ccccc1C1=NC(c2ccccc2)(C2(c3ccccc3)N=C(c3ccccc3Cl)N=C2c2ccccc2)C(c2ccccc2)=N1]

This initiator may be used in the presence of a co-initiator such as 2-mercapto benzoxazole.

In other embodiments, the initiator is an oxime ester. A suitable example has as chemical formula:

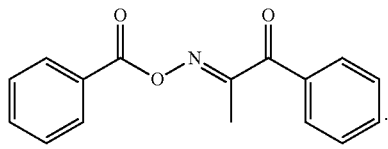 [SMILES: C/C(=N\OC(=O)c1ccccc1)C(=O)c1ccccc1]

In one or more embodiments, the amount of initiator is 0.05-50 wt % of the total weight of the curable liquid, or in other embodiments 1-15 wt %, of the total weight of the curable coating. Irradiation with actinic radiation may be realized in two steps by changing wavelength or intensity. In such cases, two types of photo-initiators may be used together. Initiators and techniques for their use are known as disclosed in US Publication No. 2010/0039463, which is incorporated herein by reference.

Other Additives of Coating Composition

A wide variety of other additives may also be used in the coating compositions and/or dispersions such as, but not limited to, polymeric dispersants, surfactants, dyes, defoamers, dendrimers, dendrites, waxes, a complete list of which can be found in the "*Two Thousand Eleven Additives Handbook*," Joseph V. Koleske, Robert Springate, and Darlene Brezinski, Paints & Coatings Industry (PCI) Magazine, June 2011, Volume 27, Number 6, page 43-77, and the Handbook of Paint and Coating Raw Materials, $2^{nd}$ Edition, Michael and Irene Ash, Synapse Information resources, 2003, incorporated herein.

In one or more embodiments, a polymeric synergist may be used. The selection of whether or not a synergist is required with a particular dispersant, and the nature and amount of the synergist, can easily be made from simple chemical considerations of the surface nature of the inorganic particulate material and of the dispersant to be used as described in the publication, Hyperdispersants, Technology & Benefits, The Lubrizol Corporation, HD-002, July, 2008.

In one or more embodiments, the coating compositions of the present invention may be characterized by having a relatively high particulate content while maintain desirable physical characteristics such as desirable viscosity.

Formation of Wet Coating

In one or more embodiments, the coating composition is applied to a substrate using known techniques. For example, the coating can be applied by known techniques, such as roll coating, spray coating, and/or vacuum coating.

In one or more embodiments, the coating composition can be applied over a wide range of temperatures including, for example, about 33° F. to about 400° F., or in other embodiments from about 40° F. to about 200° F.

The coating compositions of the present invention can be applied to create wet coatings having a wide range of thicknesses and viscosities. As those skilled in the art appreciate, the thickness and viscosity of the coating can vary depending on the desired application and the relative concentration of particulate. In one or more embodiments, relatively thick coatings or coating composites, such as those having a thickness of about 1 inch, can be prepared. In other embodiments, wet coatings can be applied at advantageously thin levels due to their relatively high particulate content while still providing advantageous coating properties such as opacity. In one or more embodiments, the coating can be applied to a substrate at a thickness of less than 25 microns, in other embodiments less than 15 microns, and in other embodiments less than 1 micron while maintaining desirable properties.

Curing Techniques

Any method known in the art for curing coating compositions can be employed in practice of the present invention. For example, conventional radical polymerization, photocuring systems using photo acid or photo base generator, or photo induction alternating copolymerization, may be employed. In particular embodiments, radical polymerization and cationic polymerization are employed. In other embodiments, photo induction alternating copolymerization, which can be used without initiator, may be employed. Furthermore, a hybrid system of combinations of these systems is also effective. In other embodiments, curing or crosslinking effected with E-beam radiation.

In other embodiments, cationic polymerization is employed, especially where is it desirable to cure in the presence of oxygen. Where cationic polymerization techniques are employed, an epoxy compound together with an oxetane compound may be used to increase the rate of polymerization.

EXAMPLES

Preparation of Pre-Dispersions

As shown in Table 1, four pre-dispersions were made using 3,4-epoxycyclohexylmethyl-3,4-epoxycyclohexane carboxylate resin obtained under the tradename UVR 6105 (Ginray), as a base resin, which was characterized by having a viscosity of 363 centistokes (cst) at 61° F. and a specific gravity of 1.11. Pre-Dispersion #1 was made with the base resin and a silsesquioxane obtained under the tradename POSS SO 1455 (Hybrid Plastics); the ingredients were mixed by stirring with a hand stirring blade at 62° F. Pre-Dispersion #2 was made with the base resin and a dispersing agent, which was a hyperdispersant obtained under the tradename Solsperse 39000 (Lubrizol Corp.); the ingredients were mixed by stirring the ingredients with a hand stirring blade at 62° F. The inventive Pre-Dispersion #3 was made using the same base resin, same silsesquioxane, and same dispersing agent employed above using the same mixing procedure; specifically the silsesquioxane was added first to the base resin and the dispersing agent was added second at amounts equal to a ratio of 2.2 parts silsesquioxane to one part dispersing agent. The viscosity of each of the three pre-dispersions, which was measurable by a Number 3, Lapine Viscosity Cup (ZAHN CUP) (Lapine Scientific Company) as is well known in the art, is reported in Table 1 in Centistokes (cst).

TABLE 1

Pre-Dispersions 1-3

| Ingredient | Base Resin/ Control | Pre-Dispersion # 1 | Pre-Dispersion # 2 | Pre-Dispersion # 3 |
|---|---|---|---|---|
| Base Resin (grams) | 300 | 300 | 300 | 300 |
| Silsesquioxane (grams) | — | 10.5 | — | 10.5 |
| Hyperdispersant (grams) | — | — | 4.73 | 4.73 |
| Total Weight (grams) | 300 | 310.5 | 304.73 | 315.23 |
| Viscosity (cst @ 62° F.) | 363 | 329.40 | 322.7 | 228.15 |

As shown in Table 1, the inventive pre-dispersion #3, which included the silsesquioxane and the dispersing agent, shows a dramatic, unexpected drop in viscosity of 37% compared to the base resin, and a dramatic, unexpected drop in viscosity of 30.7% compared to Pre-dispersion #1, which simply included the base resin and the silsesquioxane, and a dramatic, unexpected drop in viscosity of 30.8% compared to Pre-dispersion #2, which simply included the base resin and the dispersing agent.

Preparation of Dispersions with Fused Silica

As shown in Table 2, three polymeric dispersions were made from the pre-dispersions of Table 1 by incorporating about 60% by weight of a silane, surface treated, fused silica nano-spherical filler particulate available under the tradename Sunspheres™ 200 Nm ST-3 (Sun Color Corporation, North Canton, Ohio); these filler particulates were characterized as having an average particle size of 200 nanometers (nm). The dispersions were prepared by mixing and agitating the ingredients together with a high speed dispersing blade (CONN Blade) at 62° F.

Polymeric Dispersion #4, which was made with Pre-Dispersion #1, had a pasty like consistency and a viscosity greater than 70,000 centipoise. Polymeric Dispersion #5, which was made with Pre-Dispersion #2, had a pasty like consistency and a viscosity greater than 70,000 centipoise. Surprisingly, the inventive Polymeric Dispersion #6, made with the inventive Pre-Dispersion #3, had a pourable consistency and a relatively low viscosity of 4483 centipoise. The relative viscosities can be lowered proportionately by elevating the temperature of the Polymeric Dispersion and/ or by adding applicable amounts of solvents. The viscosity of each of the three Pre-Dispersions, measurable by an applicable Brookfield Viscometers as is well known in the art, is reported in Table 1 in centipoise.

TABLE 2

Polymeric Dispersions 4-6

| Ingredient | Polymeric Dispersion # 4 | Polymeric Dispersion # 5 | Polymeric Dispersion#6 |
|---|---|---|---|
| Pre-Dispersion #1 (grams) | 310.50 | | |
| Pre-Dispersion #2 (grams) | | 304.73 | |
| Pre-Dispersion #3 (grams) | | | 315.23 |
| Fused Silica Particles | 465.75 | 457.10 | 472.86 |
| Total Weight (grams) | 776.25 | 761.83 | 788.09 |
| Viscosity (@ 62° F.) | Paste Like Consistency | Paste Like Consistency | 4483 centipoise Pourable Consistency |

Preparation of Dispersions with Titanium Dioxide

As shown in Table 3, three polymeric dispersions were made from the pre-dispersions of Table 1 by incorporating about 80 wt % treated titanium dioxide (TiO2) pigment obtained under the tradename Tronox® CR-826 (TRONOX, Oklahoma, Tenn.); the pigment was characterized by having an average particle size of about 200 nanometers (nm). The dispersion was prepared by mixing and agitating the ingredients together with a high speed dispersing blade, (CONN Blade) at 62° F.

Polymeric Dispersion #7, which was made with Pre-Dispersion #1, had a paste like consistency and a viscosity greater than 70,000 centipoise. Polymeric Dispersion #8, which was made with Pre-Dispersion #2, had paste like consistency and a viscosity greater than 70,000 centipoise. Surprisingly, the inventive, Polymeric Dispersion #9, which was made with the inventive Pre-Dispersion #3, had a pourable consistency and a relatively low viscosity of 4558 centipoise. The viscosity of each of the three pre-dispersion, were measured using a Brookfield Viscometer is reported in Table 1 in centipoise.

TABLE 3

Polymeric Dispersions 7-9

| Ingredient | Polymeric Dispersion # 7 | Polymeric Dispersion # 8 | Polymeric Dispersion # 9 |
|---|---|---|---|
| Pre-Dispersion #1 (grams) | 310.50 | | |
| Pre-Dispersion #2 (grams) | | 304.73 | |
| Pre-Dispersion #3 (grams) | | | 315.23 |
| TiO2 Pigment | 1262.76 | 1239.30 | 1282.00 |
| Total Weight (grams) | 1573.26 | 1544.03 | 1597.23 |
| Viscosity (@ 62° F.) | Paste Like Consistency | Paste Like Consistency | 4558 centipoise Pourable Consistency |

Preparation of Coating Compositions and Cured Coatings

As shown in Table 4, two radiation curable, cationic coatings, having relatively low viscosities and improved properties, such as viscosity, cure time, opacity, and hardness, were made from the inventive Polymeric Dispersions #6 and #9 and compared to two coatings made from Polymeric Dispersions #4 and #7. A full description of radiation, cationic curable coatings can be found in U.S. Pat. No. 6,660,374 B2, which is incorporated herein by reference. The subject coatings were applied to a wood substrate to form a laminate. A wood substrate was first sealed with the clear to translucent coating of Example 1 made with Polymeric Dispersion #6 and then coated with the white coating of Example 2, made with Polymeric Dispersions #6 and #9. A second wood substrate was first sealed with the clear to translucent coating of Example 3 made with Polymeric Dispersion #4 and then coated with the white coating of Example 4, made with Polymeric Dispersions #7 and #4. The coatings were applied to the wood substrate with a standard draw-down bar. The ingredients used to make the coatings of Table 4 include:

Epoxide I: 3,4-epoxycyclohexymethyl-3,4-epoxycyclohexane carboxylate, commercially available from Ginray Corporation as UVR 6105.

Epoxide II: Limonene diepoxide, an epoxide diluents, and commercially available from Elf Atochem North America.

Epoxide III: 3,4-epoxycyclohexymethyl-3,4-epoxycyclohexane carboxylate, commercially available from Ginray Corporation as UVR 6110.

POLYOL I: A trifunctional poly-s-caprolactone polyol with an average molecular weight of about 300 and commercially available from Dow Chemical as TONE 0301.

Photoiniator I: A diaryliodonium hexafluoroantimonate salt in a solvent and commercially available from Sartomer Company as SarCat CD-1012.

Photoiniator II: Mixed arysulfonium hexafluroantimonate salts as a solution in propylene carbonate, and commercially available from Dow Chemical as UVI 6976.

Photosensitizer I: Isopropyl thioxanthone, a photosensitizer that functions as a photopolymerization initiator, commercially available from ACETO Corp. as Speed Cure ITX.

Polymeric Dispersion #6: Polymeric Dispersion #6 as described herein and formulated in accordance with Table #2 of this disclosure.

Polymeric Dispersion #9: Polymeric Dispersion #9 as described herein and formulated in accordance with Table #3 of this disclosure.

Polymeric Dispersion #4: Polymeric Dispersion #4 as described herein and formulated in accordance with Table #2 of this disclosure.

Polymeric Dispersion #7: Polymeric Dispersion #7 as described herein and formulated in accordance with Table #3 of this disclosure.

Dye I: Dye NLE 259121, a blue dyestuff commercially available from BASF Corp. as Thermoplast Blue 684.

Surfactant I: Silwet™ L-7604, commercially available from Witco Corp.

Defoamer I: A foam control agent commercially available from Dow Chemical as Dow Corning 163.

The coatings of Table 4 were made by first stirring together in a glass jar ingredients number 1, 2, 3, 4, 5, 6, 7, 10, 11, 12, 13 and 14, as required at a temperature of about 100° F., and then mixing in with a dispersing blade, as described above, the Polymeric Dispersions #6, #9, #4, and #7 as required.

TABLE 4

Polymeric Coating Compositions.

| Ingredients (parts by weight) | Example 1 | Example 2 | Example 3 | Example 4 |
|---|---|---|---|---|
| 1. Epoxide I | — | 71.339 | — | 71.339 |
| 2. Epoxide II | 2.591 | 15.337 | 2.591 | 15.337 |
| 3. Epoxide III | 69.975 | — | 69.975 | — |
| 4. Polyol I | 33.742 | 48.240 | 33.742 | 48.240 |
| 5. Photoiniator I | — | 8.723 | — | 8.723 |
| 6. Photoiniator II | 2.461 | — | 2.461 | — |
| 7. Photosensitizer I | 0.125 | 0.641 | 0.125 | 0.641 |
| 8. Polymeric Dispersion #6 | 68.586 | 34.283 | — | — |
| 9. Polymeric Dispersion #9 | — | 125.067 | — | — |
| 10. Polymeric Dispersion #4 | — | — | 68.586 | 34.283 |
| 11. Polymeric Dispersion #7 | — | — | — | 125.067 |
| 12. Dye I | — | 0.019 | — | 0.019 |
| 13. Surfactant I | 0.274 | — | 0.274 | — |
| 14. Defoamer 1 | 0.429 | 0.921 | 0.429 | 0.921 |
| Coating Color | Clear/Translucent | White | Clear/Translucent | White |
| Viscosity (centipoises @72° F.) | 982 | 2376 | 7,481 | 20,017 |
| Cure Time (minutes) | 12 | 17 | 18 | 29 |
| Thickness (mils) | 2 | 2 | 2 | 4 |
| Opacity (%) | N/A | About 80% | N/A | About 80% |
| Hardness (pencil) | 2H | 4H | HB | H |

The viscosities of the coatings shown in Table 4 were measured by an applicable Brookfield Viscometer and are relative viscosities as viscosity can vary with temperature. The relative viscosity of the inventive coatings in Examples 1 and 2 were very substantially lower than the viscosities of the coatings in Examples 3 and 4.

The coatings, which were applied to the wood substrate, were cured by exposure to sunlight, to form a laminate or cured article at of about 75° F. The cure through time of the inventive coatings in Example 1 and 2 was substantially faster than the cure time for the coatings in Examples 3 and 4. The relative opacity of the white coatings in Examples 2 and 4 were the same when measured on a Lanetta Chart, as is well known in the art; however, the inventive white coating of Example #2 is one-half the thickness of the white coating of Example 4. As suggested above, this is highly advantageous since it is commercially beneficial to attain the same opacity of a white coating with one half the thickness because the coating cost is less and often times a thin coating is more flexible than a thick coating. The relative hardness of the inventive white coatings of Examples 1 and 2 were substantially harder than the hardness of the coatings of Examples 3 and 4 when measured by a pencil hardness test, which is well known in the art. Pencil hardness typically indicates that a coating with a higher hardness has better scratch and mar resistance, which are valuable attributes for coatings because, for many applications, the coatings are more durable.

What is claimed is:

1. A pre-dispersion composition comprising:
   (i) a polyhedral silsesquioxane;
   (ii) a dispersing agent that is a networked or polymerized surfactant including interlinked hydrocarbon chains; and
   (iii) a curable resin, where the pre-dispersion is devoid of a particulate.

2. The pre-dispersion of claim 1, where the polyhedral silsesquioxane is a caged or partial caged structure.

3. The pre-dispersion of claim 1, where the polyhedral silsesquioxane includes one or more hydrophobic substituents and one or more hydrophilic substituents.

4. The pre-dispersion of claim 1, where the composition includes from about 0.5 to about 40 wt % of the silsesquioxane, from about 0.5 to about 30 wt % of the dispersing agent; and at least 30 wt % and at most 99 wt % of the curable resin.

5. The pre-dispersion of claim 1, where the dispersing agent is a polymerized or interesterified hydroxycarboxylic acid.

6. The pre-dispersion of claim 1, where the dispersing agent is a poly-hydroxy-(long chain fatty acid).

7. The pre-dispersion of claim 5, where the pre-dispersion consists of the (i) polyhedral silsesquioxane; (ii) the dispersing agent, and (iii) the curable resin, and optionally a solvent.

8. A dispersion composition comprising:
   (i) a polyhedral silsesquioxane;
   (ii) a dispersing agent that is a networked or polymerized surfactant including interlinked hydrocarbon chains;
   (iii) a particulate; and
   (iv) a curable resin, where the composition includes at least 30 wt % particulate.

9. The dispersion of claim 8, where the polyhedral silsesquioxane is a caged or partial caged structure.

10. The dispersion of claim 8, where the polyhedral silsesquioxane includes one or more hydrophobic substituents and one or more hydrophilic substituents.

11. The dispersion of claim 6, where the particulate is titanium dioxide or fused silica.

12. The dispersion of claim 8, where the composition includes from about 0.1 to about 5 wt % of the silsesquioxane, from about 0.1 to about 5 wt % of the dispersing agent; and at least 40 wt % of the particulate.

13. The dispersion of claim 8, where the dispersing agent is a polymerized or interesterified hydroxycarboxylic acid.

14. The dispersion of claim 8, where the dispersion will maintain its original viscosity within at most 20% after aging for seven days at 55° C.

15. The dispersion of claim 8, where the dispersion includes at least 55 wt % of the particulate.

16. The dispersion of claim 8, where the particulate is a pigment or a particulate filler.

17. The dispersion of claim 16, where the particulate is an organic pigment, an inorganic pigment, an organic filler, an inorganic filler, or a combination thereof.

18. A method for preparing a coating composition, the method comprising adding a dispersion to a coating composition, where the dispersion includes (a) a polyhedral silsesquioxane; (b) a dispersing agent that is a networked or polymerized surfactant including interlinked hydrocarbon chains; (c) a curable resin; and (d) at least 30 wt % particulate, where the coating composition includes an initiator.

* * * * *